(12) United States Patent
Farkash et al.

(10) Patent No.: US 8,731,193 B2
(45) Date of Patent: May 20, 2014

(54) PARTIAL ENCRYPTION USING VARIABLE BLOCK SIZES

(75) Inventors: Eyal Farkash, Raanana (IL); Kevin A. Murray, Hampshire (GB)

(73) Assignee: Cisco Technology Inc., San Jose, CA (US)

( * ) Notice: Subject to any disclaimer, the term of this patent is extended or adjusted under 35 U.S.C. 154(b) by 111 days.

(21) Appl. No.: 13/379,552

(22) PCT Filed: Dec. 27, 2009

(86) PCT No.: PCT/IB2009/055954
§ 371 (c)(1),
(2), (4) Date: Feb. 2, 2012

(87) PCT Pub. No.: WO2010/150056
PCT Pub. Date: Dec. 29, 2010

(65) Prior Publication Data
US 2012/0134496 A1 May 31, 2012

(30) Foreign Application Priority Data

Jun. 22, 2009 (IL) .......................................... 199486

(51) Int. Cl.
*H04N 7/167* (2011.01)
(52) U.S. Cl.
USPC ..................................... 380/210; 375/240.13
(58) Field of Classification Search
USPC ..................................... 380/210; 375/240.13
See application file for complete search history.

(56) References Cited

U.S. PATENT DOCUMENTS

| | | | |
|---|---|---|---|
| 5,600,721 A * | 2/1997 | Kitazato | 380/217 |
| 5,621,794 A * | 4/1997 | Matsuda et al. | 380/217 |
| 5,684,876 A | 11/1997 | Pinder et al. | |
| 6,976,166 B2 | 12/2005 | Herley et al. | |
| 7,124,303 B2 | 10/2006 | Candelore et al. | |
| 7,139,398 B2 | 11/2006 | Candelore et al. | |
| 7,151,831 B2 | 12/2006 | Candelore et al. | |
| 7,167,560 B2 | 1/2007 | Yu | |
| 7,218,738 B2 | 5/2007 | Pedlow, Jr. et al. | |
| 7,242,773 B2 | 7/2007 | Candelore | |
| 7,302,059 B2 | 11/2007 | Candelore et al. | |

(Continued)

FOREIGN PATENT DOCUMENTS

| | | |
|---|---|---|
| EP | 1 124 376 | 8/2001 |
| FR | 2 860 122 | 3/2005 |
| FR | 2 879 878 | 6/2006 |
| WO | WO 2007/044276 | 4/2007 |

OTHER PUBLICATIONS

Wu et al., "Design of Integrated Multimedia Compression and Encryption Systems," IEEE Transactions on Multimedia, vol. 7, No. 5, Oct. 2005, (11 pgs.).

(Continued)

*Primary Examiner* — Matthew Smithers
(74) *Attorney, Agent, or Firm* — Husch Blackwell LLP

(57) ABSTRACT

A method for data processing, comprising providing a sequence of image frames that is encoded by identifying intra and inter frames in the sequence and applying a variable block size motion compensation (VBSMC) procedure to the inter frames, thereby generating respective parameters representing the inter frames; selectively encrypting the block sizes, using an encryptor, without encrypting all of the parameters representing the inter frames; and outputting encoded data representing the sequence of the image frames and comprising the encrypted block sizes.

25 Claims, 4 Drawing Sheets

(56) References Cited

U.S. PATENT DOCUMENTS

| | | | |
|---|---|---|---|
| 2001/0028725 A1* | 10/2001 | Nakagawa et al. | 382/100 |
| 2005/0040973 A1* | 2/2005 | Koto et al. | 341/50 |
| 2005/0152548 A1 | 7/2005 | Wasilewski | |
| 2005/0185795 A1* | 8/2005 | Song et al. | 380/218 |
| 2006/0164544 A1 | 7/2006 | Lecomte et al. | |
| 2006/0165232 A1* | 7/2006 | Burazerovic et al. | 380/37 |
| 2007/0083467 A1 | 4/2007 | Lindahl et al. | |
| 2007/0098000 A1* | 5/2007 | Wajs et al. | 370/412 |
| 2008/0260028 A1* | 10/2008 | Lamy-Bergot et al. | 375/240.13 |

OTHER PUBLICATIONS

International Search Report and Written Opinion for International Application No. PCT/IB2009/055954, dated Apr. 22, 2010 (14 pages).

Aly et al., "A Light-Weight Encrypting for Real Time Video Transmission," CTI Symposium Conference, DePaul University, Chicago, USA, Nov. 2003, (10 pages).

Liu, et al., "A Selective Video Encryption Scheme for MPEG Compression Standard," The Institute of Electronics, Information and Communication Engineers, IEICE Trans. Fundamentals, vol. E89-A, No. 1 Jan. 2006 (pp. 194-202).

Iqbal et al., "Compressed-domain Encryption of Adapted H.264 Video", in Proceedings of IEEE Workshop on Security and Pervasive Multimedia, Environments(MultiSec), San Diego, CA, USA, Dec. 11-13, 2006, (pp. 979-984).

Benabdellah et al., "Encryption-Compression of still images using the FMT transformation and the DES algorithm," Georgian Electronic Scientific Journal: Computer Science and Telecommunications 2006, No. 4(11) (pp. 22-31).

Benabdellah, et al., "Encryption-Compression of Images Based on FMT and AES algorithm," Applied Mathematical Sciences, vol. 1, No. 45, 2007, (pp. 2203-2219).

Shahid et al., "Fast Protection of H.264/AVC by Selective Encryption of Cabac," IEEE, ICME 2009 (pp. 1038-1041).

Furht, et al., "Fundamentals of Multimedia Encryption Techniques," a chapter in Multimedia Security Handbook, CRC Press, 2005 (50 pages).

Kim, et al., "Information hiding for digital holograms by electronic partial encryption methods," Article in Press, Elsevier B.V., Opt. Communications, 2007 (11 pages).

"Series H: Audiovisual and Multimedia Systems Infrastructure of audiovisual services—coding of moving video—Advanced video coding for generic audiovisual services," ITU-T Telecommunication Standardization Sector of International Telecommunication Union, ITU-T Recommendation H.264, Mar. 2005 (343 pages).

Yong, "MPEG Video Content protection based on Fingerprinting Scheme," IJCSNS International Journal of Computer Science and Network Security, vol. 7, No. 10, Oct. 207 (pp. 161-166).

"Multimedia Information Partial-Encryption System," http://sciencelinks.jp/j-east/article/200019/000020001900A0447178.php (1 page).

Luo, et al., "On Empirical Evaluation of Partial Encryption for Image Sets," http://ww1.ucmss.com/books/LFS/CSREA2006/IPC4 (4 pages).

Cheng, "Partial Encryption for Image and Video Communication," A Thesis submitted to the Faculty of Graduate Studies and Research in partial fulfillment of the requirements for the degree of Master of Science, Department of Computing Science, University of Alberta, Edmonton, Alberta, Fall 1998 (95 pages).

Cheng, et al., Partial Encryption of Compressed Images and Videos, IEEE Transactions on Signal Processing, vol. 48, No. 8, Aug. 2000 (pp. 2439-2451).

Droogenbroeck, "Partial Encryption of Images for Real-Time Applications," 4th IEEE Signal Processing Symposium, Apr. 2004 (pp. 11-15).

Yuksel, "Partial Encryption of Video for Communication and Storage," A Thesis Submitted to the Graduate School of Natural and Applied Sciences of the Middle East Technical University, in Partial Fulfillment of the Requirements for the Degree of Master of Science in the Department of Computer Engineering, Sep. 2003 (78 pages).

Griwodz, et al., "Protecting VoD the Easier Way," Presented at ACM Multimedia, Bristol UK, Sep. 12-16, 1998 (8 pages).

Engel, et al., "Security Enhancement for Lightweight JPEG 2000 Transparent Encryption," IEEE, ICICS 2005, (pp. 1102-1104).

Liu, et al., "Selective Encryption of Multimedia Content in Distribution Networks: Challenges and New Directions," *IASTED Communications, Internet & Information Technology (CIIT)*, Scottsdale, AZ, Nov. 2003, (pp. 1-10).

Lian, et al., "Selective Video Encryption Based on Advanced Video Coding," Advances in Multimedia Information Processing, PCM 2005, Lecture Notes in Computer Science, vol. 2768, 2005 (pp. 281-290).

Kunkelmann et al., "Video Encryption Based on Data Partitioning and Scalable Coding—A Comparison," Proc. 5th Int'l Workshop Interactive Distributed Multimedia Systems and Telecommunication Services, IDMS '98 Springer-Verlag Heidelberg, Lecture Notes in Computer Science, vol. 1483, 1998 (pp. 95-106).

Kundur et al., "Video Fingerprinting and Encryption Principles for Digital Rights Management," Proceedings of the IEEE, vol. 92, No. 6, Jun. 2004 (pp. 918-932).

Seo et al., "Wavelet Domain Image Encryption by Subband Selection and Data Bit Selection", in World Wide Congress (3G Wireless), San Francisco, May 2003 (6 pgs).

May 17, 2013 Office Communication in connection with prosecution of EP 09 807 720.9.

*Information technology—Generic Coding of moving pictures and associated audio information: Video*; ISO/IEC 13818-2 (2d ed., p. 5) (Dec. 15, 2000).

\* cited by examiner

PARTIAL ENCRYPTION USING VARIABLE BLOCK SIZES

CROSS REFERENCE TO RELATED APPLICATIONS

The present application is a 35 USC §371 application of PCT/IB2009/055954, filed on Dec. 27, 2007 and entitled "Partial Encryption Using Variable Block-Size Parameters", which was published in the English language with International Publication Number WO 2010/150056, and which claims the priority of Israeli Patent Application No. IL 199486 of NDS Limited, filed Jun. 22, 2009, the content of all of which is incorporated herein by reference.

FIELD OF THE INVENTION

The present invention relates generally to data encryption, and specifically to encryption of a compressed video data stream.

BACKGROUND OF THE INVENTION

In conventional pay TV broadcast systems, the payload of every packet is scrambled. The key required for descrambling is provided only to authorized subscribers, in order to prevent unauthorized parties from viewing the broadcast content.

Methods have been developed for encrypting only a portion of the video data stream. For example, U.S. Patent Application Publication 2007/0083467, whose disclosure is incorporated herein by reference, describes techniques for partially encrypting media files. Although only partial encryption is used, the portion being encrypted disrupts the usefulness of other, non-encrypted parts of the media file. The disclosed techniques are said to render the media file substantially unusable by unauthorized users. Since the media files are only partially encrypted, the decryption is likewise only partial, which makes decryption by authorized client devices faster and less resource-intensive.

As another example, U.S. Pat. No. 7,124,303, whose disclosure is incorporated herein by reference, describes an encryption arrangement for television programs in which only a portion of the data required for full presentation of a program is encrypted. In one embodiment, only audio data are encrypted, leaving video in the clear. This sort of approach is said to permit coexistence of multiple conditional access encryption systems, with multiple manufacturers' set-top boxes, within a single system.

SUMMARY OF THE INVENTION

Embodiments of the present invention that are described hereinbelow provide methods, systems and software for selectively encrypting a relatively small portion of a compressed video stream. The portion for encryption is selected, however, so as to render all or nearly all the content of the video stream inaccessible to unauthorized users.

There is therefore provided, in accordance with an embodiment of the present invention, a method for data processing, including providing a sequence of image frames that is encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients. The block sizes are selectively encrypted, using an encryptor, without encrypting all of the parameters representing the inter frames. Encoded data are outputted representing the sequence of the image frames and including the encrypted block sizes.

In a disclosed embodiment, the sequence includes a video sequence that is compressed using a H.264 video encoder. Outputting the encoded data may include transmitting the encoded data over a network to a client device, wherein the method includes decrypting the encrypted block sizes at the client device, and using the decrypted block sizes in decoding the data so as to reconstruct the sequence of the image frames. Optionally, the method includes selectively encrypting at least a part of the intra frames, in addition to encrypting the block sizes.

In one embodiment, selectively encrypting the block sizes includes encrypting the block sizes in the video encoder as a part of a process of encoding the sequence of the image frames. Alternatively, providing the sequence of the image frames includes receiving an input file of compressed video data, and selectively encrypting the block sizes includes processing the input file so as to identify the block sizes, and replacing the block sizes with the encrypted block sizes.

In a disclosed embodiment, the block sizes are selectively encrypted without encrypting the transform coefficients.

In some embodiments, selectively encrypting the block sizes includes evaluating a distribution of different values of the block sizes over the sequence, and choosing a mode of encryption to apply to the images responsively to the distribution. Choosing the mode of the encryption may include encrypting a smaller part of the inter frames when the values of the block sizes are widely distributed over the image frames in the sequence than when the block sizes than when the block sizes are not widely distributed.

There is also provided, in accordance with an embodiment of the present invention, apparatus for data processing, including an encoder, which is configured to output encoded data representing a sequence of image frames, wherein the image frames are encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients. An encryptor is configured to selectively encrypt the block sizes without encrypting all of the parameters representing the inter frames, and to provide the encrypted block sizes for insertion in the encoded data output by the encoder.

There is additionally provided, in accordance with an embodiment of the present invention, a computer software product, including a computer-readable medium in which program instructions are stored, which instructions, when read by a computer, cause the computer to partially encrypt a sequence of image frames that is encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients, by selectively encrypting the block sizes without encrypting all of the parameters representing the inter frames, and to output encoded data representing the sequence of the image frames and including the encrypted block sizes.

There is further provided, in accordance with an embodiment of the present invention, a method for data processing, including receiving a partially-encrypted sequence of image frames that has been encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients, and by selectively encrypting the block sizes without encrypting all of the parameters representing the inter frames. The block sizes are decrypted using a decryptor, and the encoded image frames are decoded in a decoder using the decrypted block sizes.

There is moreover provided, in accordance with an embodiment of the present invention, a client device, including a receiver, which is configured to receive a partially-encrypted sequence of image frames that has been encoded by identifying intra and inter frames in the sequence and applying a variable block size motion compensation (VB-SMC) procedure to the inter frames, thereby generating respective parameters representing the inter frames, the parameters including block sizes, motion vectors, and transform coefficients, and by selectively encrypting the block sizes without encrypting all of the parameters representing the inter frames. A decryptor is coupled to decrypt the block sizes, and a decoder is configured to decode the encoded image frames using the decrypted block sizes.

There is furthermore provided, in accordance with an embodiment of the present invention, a computer software product, including a computer-readable medium in which program instructions are stored, which instructions, when read by a computer, cause the computer to receive a partially-encrypted sequence of image frames that has been encoded by identifying intra and inter frames in the sequence and applying a variable block size motion compensation (VB-SMC) procedure to the inter frames, thereby generating respective parameters representing the inter frames, the parameters including block sizes, motion vectors, and transform coefficients, and by selectively encrypting the block sizes without encrypting all of the parameters representing the inter frames, to decrypt the block sizes, and to decode the encoded image frames using the decrypted block sizes.

The present invention will be more fully understood from the following detailed description of the embodiments thereof, taken together with the drawings in which:

DETAILED DESCRIPTION OF EMBODIMENTS

Overview

Figure 1:
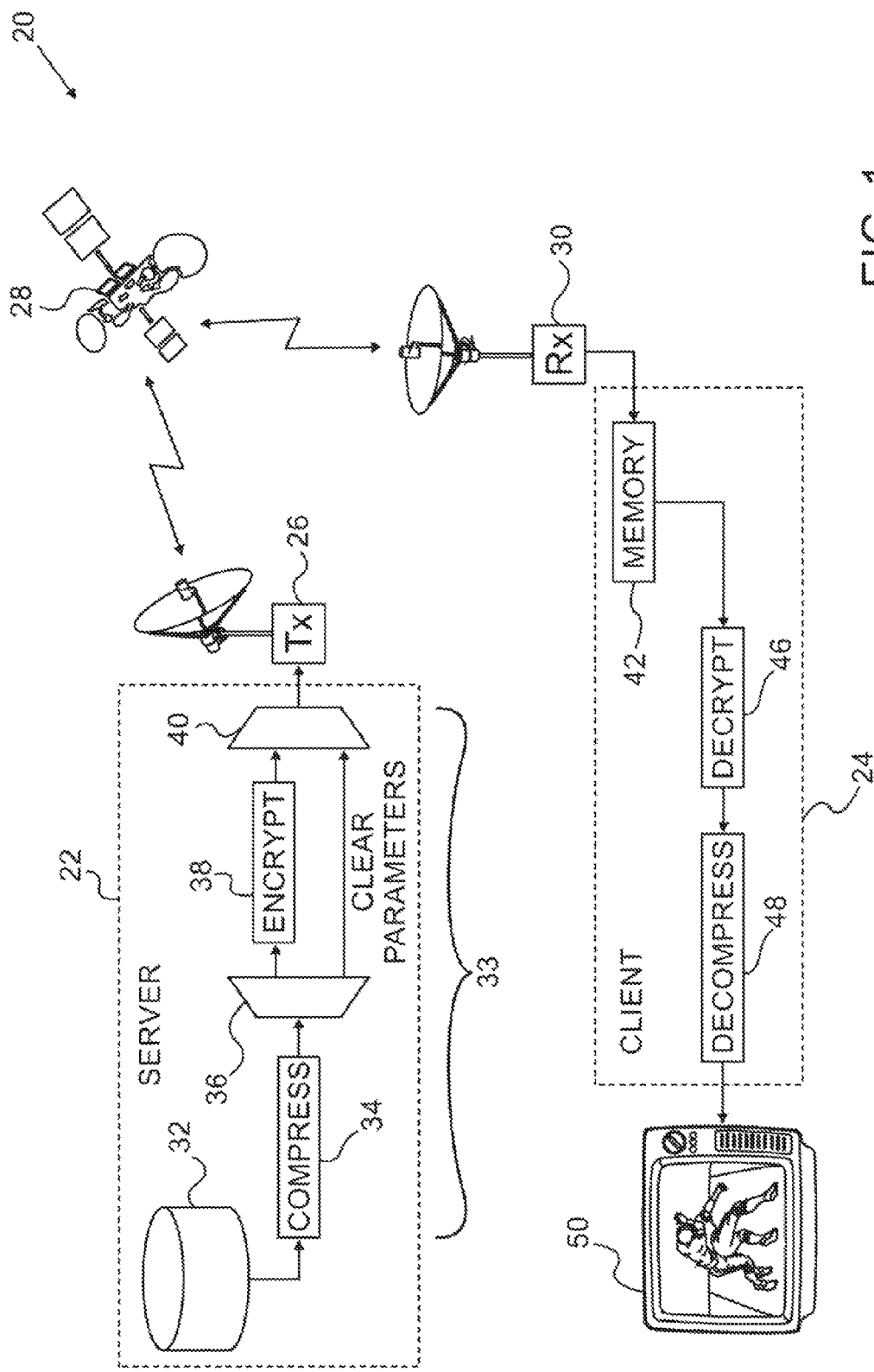
FIG. 1 is a block diagram that schematically illustrates a system for encrypted communications, in accordance with an embodiment of the present invention.

Digital video programs are commonly distributed in encrypted form in order to prevent unauthorized playback. The process of encryption converts ordinary information (referred to as "plaintext") into unintelligible "ciphertext." Decryption is the reverse process, converting ciphertext back to plaintext. Various algorithms—known as "ciphers"—are used for encryption and the reverse decryption process. The cipher uses a secret parameter, known as a "key," in carrying out the encryption and decryption processes.

Strong encryption algorithms are generally preferred because they are more difficult for hackers to "crack," but strong encryption and decryption are computationally complex and expensive. For small-scale computing devices, such as embedded processors in television set-top boxes, mobile phones and portable entertainment units, decrypting an encrypted video stream can overburden their limited resources.

One solution to this problem is to strongly encrypt only a portion of the video stream. Partial encryption schemes of this sort, however, may suffer from the drawback that if only a small part of the data is encrypted, the unencrypted part may still be accessed by unauthorized users. Embodiments of the present invention that are described hereinbelow address this issue by encrypting a particular small part of the compressed video stream. Specifically, these embodiments selectively compress block size information that is associated with variable block-size motion compensation (VBSMC). This sort of motion compensation is provided, for example, by the H.264 video compression standard.

H.264 is a relatively new standard, also known as MPEG-4 Part 10, which is described in ISO/IEC International Standard 14496-10:200X(E), entitled "Information Technology—Coding of Audio-Visual Objects—Part 10: Advanced Video Coding" (Fourth Edition, 2007), which is incorporated herein by reference. H.264 is intended to replace the older MPEG-2 standard and includes a number of new features that make it possible to compress video more effectively and to provide more flexibility for network-based applications. A number of these features are directed to improving the flexibility with which "inter" frames may be encoded based on "intra" frames (known in H.264 as Instantaneous Decoding Refresh, or IDR, frames).

Both MPEG-2 and MPEG-4 Part 10/H.264 use motion prediction and compensation as part of the video encoding process. Blocks of pixels in the inter frames are matched to corresponding blocks in other frames in order to derive motion vectors, which become part of the encoded video stream and are then used in reconstructing the original inter frames during the decoding process. MPEG-2 motion compensation uses only macro-blocks of 16×16 pixels and fixed blocks of 8×8 pixels. In H.264, on the other hand, block sizes are variable, from as large as 16×16 to as small as 4×4, so as to enable precise segmentation of moving regions. The supported luma prediction block sizes in H.264 include 16×16, 16×8, 8×16, 8×8, 8×4, 4×8, and 4×4, many of which can be used together in a single macroblock; and other codecs, known in the art and in development, use an even wider range of block sizes. (Chroma prediction block sizes are correspondingly smaller, according to the chroma sub-sampling in use.)

Other advanced video coding formats, such as Windows Media® Video (WMV), DivX, and On2 Flash®, for example, likewise use VBSMC or similar motion compensation mechanisms. Thus, although the embodiments described hereinbelow refer specifically to encryption of block size values in H.264 compression, the principles of the present invention are by no means limited to this particular standard and may be applied, mutatis mutandis, in conjunction with substantially any VBSMC-type encoding technique.

System Description

FIG. 1 is a block diagram that schematically illustrates a system 20 for encrypted communications, in accordance with an embodiment of the present invention. System 20 is shown here as an example of an application in which the principles of the present invention may be applied. The encryption and decryption techniques that are described hereinbelow, however, are in no way limited to the context of this illustrative embodiment, and may be applied in substantially any setting in which encryption is used, whether or not associated with communications.

In system 20, a server 22 transmits encrypted data to a client 24. In this example, the data are assumed to comprise MPEG video broadcast media, which are encoded in accordance with the H.264 standard and are transmitted over a wireless link between a transmitter 26, a satellite 28, and a receiver 30. Alternatively, server 22 and client 24 may communicate over networks of other types, including both wireless networks and terrestrial networks, such as a cable television network or the Internet, with appropriate changes to the transmitter and receiver as will be apparent to those skilled in the art. In the pictured embodiment, server 22 may be operated by a video broadcast distributor, for example, while client 24 comprises a television set-top box or other receiving device. The video broadcast distributor transmits the media in partially-encrypted form, using VBSMC-based encryption, to ensure that only legitimate clients can decrypt and play the content, but that they can do so in real time, without overburdening their computational resources.

Server 22 comprises or is coupled to a media repository 32, which contains digital video content, in the form of sequences of image frames (typically with accompanying audio). The server comprises an encoder 33, which performs compression and encryption functions. A compression module 34 in the encoder encodes a sequence of image frames by identifying intra and inter frames in the sequence and applying a variable block size motion compensation (VBSMC) procedure to the inter frames. This encoding procedure generates respective parameters representing the inter frames, including block sizes, motion vectors, and transform coefficients, such as the discrete cosine transform (DCT) coefficients that are used in H.264, as well as in other compression standards.

Encoder 33 selectively encrypts the block sizes without encrypting all of the parameters representing the inter frames. In conceptual terms, a demultiplexer 36 separates the components of the encoded media stream that are to be encrypted from the remaining components, which are to be transmitted in the clear, and passes the components that are to be encrypted to an encryptor 38. In practice, however, the encryptor may actually be integrated with the compression module, as shown below in FIG. 2. Typically, encryptor 38 also encrypts at least a part of the IDR (intra) frame data, as described further hereinbelow. Optionally, though not necessarily, other inter-frame parameters, such as the motion vectors, may be encrypted, as well. Most of the encoded data representing the inter frames, however, remains unencrypted.

Encryptor 38 encrypts the block sizes and other data using a suitable encryption algorithm, selected from the large range of ciphers that are known in the art. A multiplexer 40 then recombines the encrypted data with the remaining plaintext (clear) parameters, and outputs encoded data representing the sequence of the image frames and including the encrypted block sizes, for transmission over the satellite link. Other aspects of the encoding process that are known in the art, such as entropy coding and possibly multiplexing of audio with the video data, are omitted from FIG. 1 for the sake of simplicity. Entropy coding is described in greater detail hereinbelow.

Client 24 receives the encrypted data stream into a buffer memory 42. (At this stage, demultiplexing of audio from video data and reverse entropy coding also take place.) A decryptor 46 decrypts the encrypted components, including the block sizes, IDR frames, and possibly other elements, while leaving the plaintext parameters untouched. A decompression module 48 converts the compressed records into an uncompressed video stream, which may then be output to a display 50.

Decryptor 46 uses a key, which is typically provided to subscribers by the broadcast operator. In the absence of the key, an unauthorized client will be able to read most of the data stream, but in the absence of the block sizes will be unable to reconstruct the images. If the IDR frames are encrypted, the unauthorized client will not be able to reconstruct any of the images; but even if the IDR frames are transmitted without encryption, the unauthorized client will still be unable to reconstruct the inter frames. Every inter frame is encoded using thousands of blocks. Typically, within any given frame, different blocks will have different dimensions, and at least some of the block dimensions change within the frame and from frame to frame. Therefore, although the hacker may be able to freely read the motion vectors and DCT coefficients, there is no way for the hacker to identify a priori the blocks to which the motion vectors are to be applied. Furthermore, a brute-force attempt to reconstruct the inter frames by trial and error will not work without painstaking human involvement, since only a human observer will be able to tell, by looking at the images, when the correct block sizes have been chosen. Thus, despite the small amount of block size information in each frame—making it easy for the authorized client to decrypt with the proper key—encrypting this information makes it nearly impossible for a hacker to use any of the inter frame images.

For efficient processing, encoder 33 (including compression module 34 and encryptor 38) typically comprises dedicated hardware logic circuits, in the form of an application-specific integrated circuit (ASIC), field programmable gate array (FPGA), or full-custom integrated circuit, or a combination of such devices. Alternatively or additionally, some or all of the functions of the encoder may be carried out by a programmable processor, such as a microprocessor or digital signal processor (DSP), under the control of suitable software. This software may be downloaded to the processor in electronic form, over a network, for example. Alternatively or additionally, the software may be stored on tangible storage media, such as optical, magnetic, or electronic memory media.

Decryptor 46 and decompression module 48 may similarly be implemented in either hardware or software or a combination of hardware and software components of the types described above. Software implementation of these elements of client 24 can be advantageous in reducing cost and therefore gives added impetus to the use of a partial encryption scheme, such as that described herein, which facilitates software-based decryption. The software used in client 24 may likewise be provided in electronic form and/or stored on tangible media.

The remaining components of system 20 are standard elements, whose construction will be apparent to those skilled in the art.

Encryption Integrated with Encoding

Figure 2:
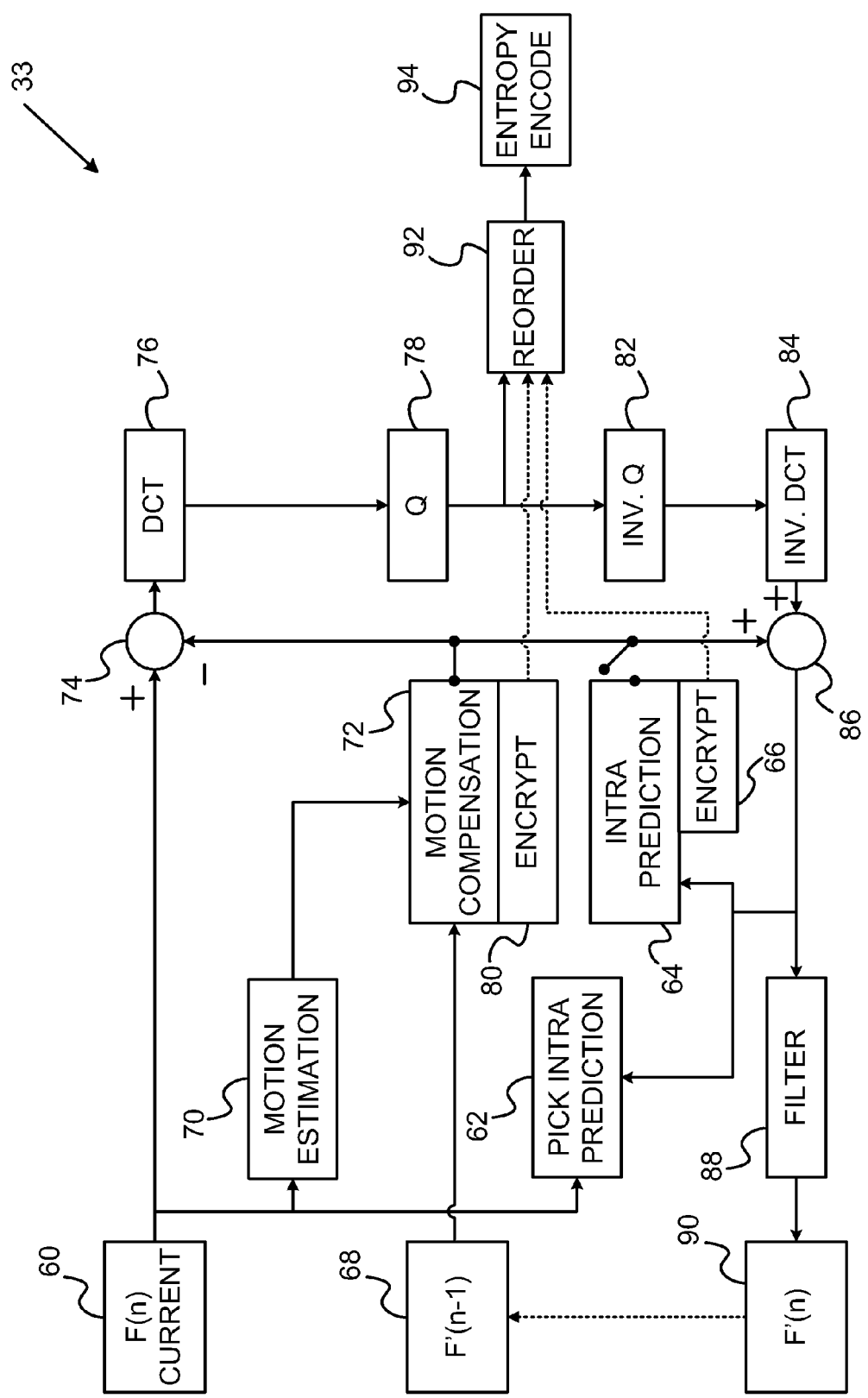
FIG. 2 is a block diagram that schematically illustrates a video encoder with encryption functions, in accordance with an embodiment of the present invention.

FIG. 2 is a block diagram that schematically shows details of encoder 33, in accordance with an embodiment of the present invention. In this embodiment, the encryption functions of encryptor 38 are integrated with the other encoding functions of compression module 34. The compression encoding scheme shown in this figure is simplified, to focus on the elements of the encoder that are most relevant to the encryption methods described herein, and additional details may be found in the above-mentioned MPEG-4 standard.

The forward path in encoder 33 encodes each current frame 60, referred to as F(n), in the succession of image frames that make up the video sequence. The frames are pre-classified as intra-coded (intra, or IDR) frames and inter-coded (inter) frames, wherein for H.264, the intra frames commonly occur no more than once per second, and may come only once in many (five or more) seconds, since there is no real limitation on the spacing between intra frames. In the intra frames, an intra prediction module compresses each successive image block using the preceding block, with prediction parameters set by a picking unit 62. The resulting block parameters are encrypted by an intra encryptor 66.

Typically, intra encryptor 66 encrypts the initial bits (for example, 1024 or 2048 bits) of each intra frame. These bits contain tables that are needed to reconstruct the frame, and encryption of these tables thus prevents unauthorized viewers from seeing the picture. This limited sort of encryption may not be fully secure, however, since the size of the image and other parameters in the intra frame might allow some parts of the image to be seen. Thus, intra encryptor 66 may alternatively encrypt larger parts or even the entire intra frame. Alternatively, in other embodiments, the intra frames may not be encrypted at all.

Encoder 33 encodes inter frames with reference to at least one preceding frame 68, labeled F'(n−1). In this case, a motion estimation module 70 finds a respective motion vector for each block in F(n) relative to the preceding frame or frames. As noted earlier, different block sizes may be used within any given frame in order to facilitate more accurate motion estimation. Details of this process re described in the MPEG-4 standard (see particularly sections 7.3.5, 7.3.5.2, 7.4.5, and 7.4.5.2, along with tables 7-11, 7-12, 7-13, 7-14, 7-17 and 7-18). Briefly put, the parameters used to encode each 16×16 macroblock in F(n) include a value known as "mb_type," which typically takes values between 0 and 24, indicating, inter alia, the size of the macroblock and its possible division down to 8×8 block sizes. For 8×8 blocks, a subsidiary "sub_mb_type" value is present, carrying the same information about a further level of division of blocks down to 4×4 sizes. The interpretation and ranges of these values are dependent on the encoding type (intra or inter).

The block size values in the mb_type and sub_mb_type fields thus specify several parameters that will be needed in order to decode and interpret the data that follow. Without the correct values, the rest of the data will be near impossible to decode. These block size values are encrypted by an inter encryptor 80.

A motion compensation module 72 shifts the blocks in F'(n−1) in accordance with the corresponding motion vectors, and a subtractor 74 takes the difference between F(n) and the shifted version of F'(n−1) in order to find the residual image that is not predicted by the motion vectors. This residual image is transformed by a DCT module 76, which computes DCT frequency-domain coefficients representing the residual image blocks. A quantizer 78 truncates the coefficients to lengths that are appropriate for the desired degree of compression.

In order to generate a reconstructed frame 90, labeled F'(n), for use as the next preceding frame 68, the above process is reversed: An inverse quantizer 82 extends the truncated coefficients, and an inverse DCT module 84 retransforms the residual image to the spatial domain. An adder 86 sums this retransformed image with the output of intra prediction module 64 or motion compensation module 72, as appropriate. A filter 88 processes the summed result to remove noise and artifacts, thus yielding reconstructed frame 90.

The output bit stream from encoder 33 comprises the encrypted intra frame parameters provided by encryptor 66 and the encrypted block size parameters provided by encryptor 80, along with the motion vectors from motion estimation module 70, quantized transform coefficients from quantizer 78, and other data and metadata as specified by the H.264 standard. Although only certain parameters are shown as being encrypted in the scheme of FIG. 2 (including particularly the inter frame block size parameters and certain intra frame parameters), other components of the encoded data may also be encrypted. For example, a part or all of the motion vectors may be encrypted, as well.

A reordering module 92 receives the various output components and arranges them in the proper order for output to enable the client to decode them, in accordance with the H.264 standard. For further compression, the bit stream that is output by module 92 is then encoded by an entropy encoder 94. The MPEG-4 standard offers two alternative types of entropy encoding: context-adaptive variable-length coding (CAVLC) and context-adaptive binary arithmetic coding (CABAC), either of which may be used in embodiments of the present invention. Encoder 94 uses encoding tables (not shown in the figures), which may also be encrypted, for the sake of added security, before transmission to the client.

Furthermore, the use of entropy encoding following partial encryption of block size parameters in encoder 33 adds a further dimension of difficulty for the hacker attempting to reconstruct the image sequence from the output video stream. For any given image sequence, the outputs of encryptors 66 and 80 will vary widely depending on the encryption key that they use, and this variation will result in major differences in the output file generated by entropy encoder 94. When CABAC entropy encoding is used, each encoded value depends on the preceding value, and a decoding error will therefore propagate to subsequent symbols when a client attempts to reconstruct and play back the image sequence. The above-mentioned block size values (mb_type and sub_mb_type) specify parameters that must be used in decoding and reconstructing the image frames. Therefore, if a program attempting to hack the partially-encrypted video stream guesses the wrong block size value, the entire entropy decoding process may be disrupted, resulting in a total loss of data until at least the next synchronization point in the video stream.

Post-Encoding Encryption

Figure 3:
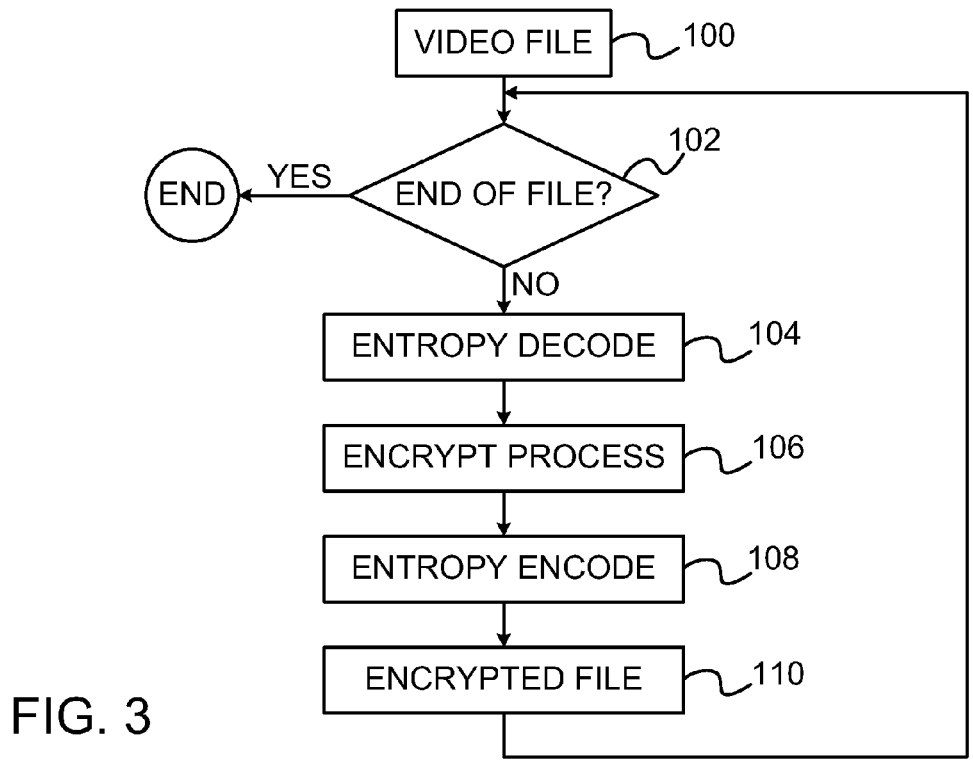
FIG. 3 is a flow chart that schematically illustrates a method for encrypting a compressed video file, in accordance with an embodiment of the present invention.

FIG. 3 is a flow chart that schematically illustrates a method for encrypting a video file 100 that has already been encoded for compression, in accordance with an embodiment of the present invention. This method may be less secure than the integrated approach illustrated in FIG. 2, but it may be necessary in certain cases, such as when a video broadcast provider receives content for distribution that is already in compressed form. In such cases, it is necessary to identify and encrypt the block size parameters, possibly along with other components of the data stream that are to be encrypted. It is also desirable that the broadcast provider verify that the compression scheme used by the content provider included enough different block sizes to ensure that the partial encryption scheme is secure; if not, other components of the data stream should be encrypted, either in addition to or instead of the block size values.

At each pass through the steps in FIG. 3, the encryptor carrying out the method checks whether it has reached the end of file 100, at a file end checking step 102. Until it reaches the end of the file, and assuming file 100 is entropy-coded, the encryptor applies the appropriate entropy decoding scheme to recover the encoded image data, at a decoding step 104. The encryptor then partially encrypts the data, including values of the block sizes used in inter frames, as explained above, in an encryption step 106. Details of this step are shown in the figures that follow.

After the appropriate parts of the data have been encrypted, the encryptor re-encodes the data using entropy encoding, at an encoding step 108. The result is an encrypted file 110, which may now be saved and/or sent to clients as appropriate. As noted earlier, because of the changes in the file data due to the partial encryption performed at step 106, entropy encoding at step 108 will result in a file that is outwardly completely different from the original video file 100.

Figure 4:
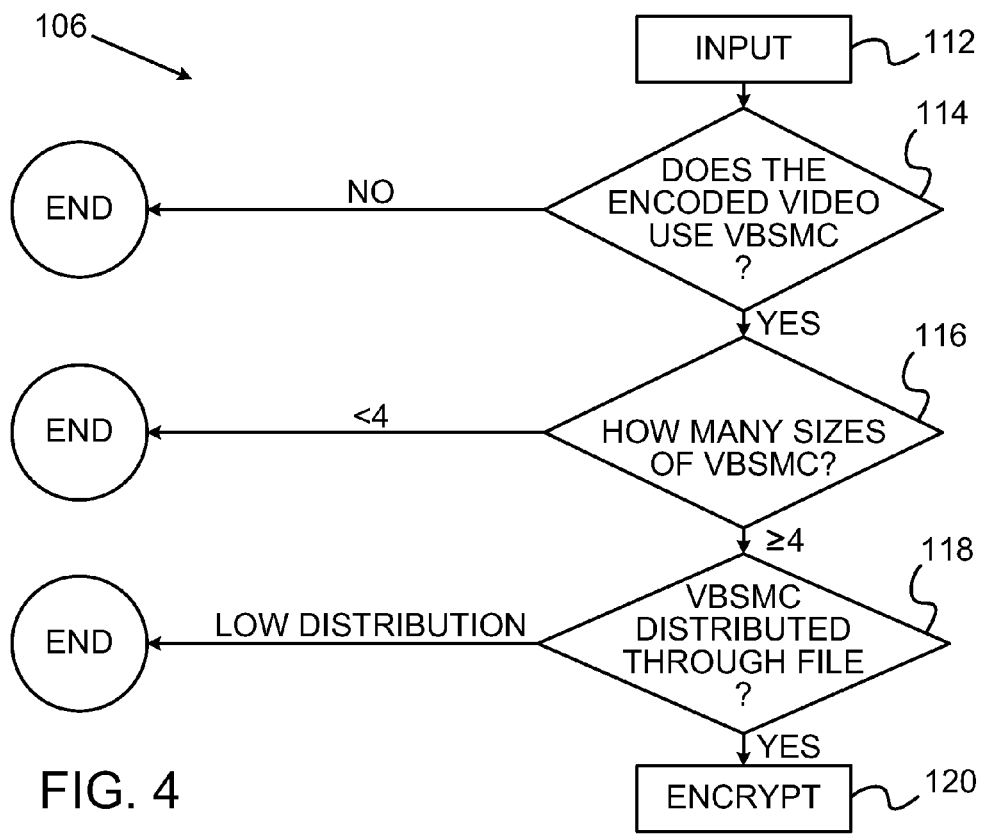
FIG. 4 is a flow chart that schematically illustrates a method for encryption processing, in accordance with an embodiment of the present invention.

FIG. 4 is a flow chart that schematically shows details of encryption step 106, in accordance with an embodiment of the present invention. The method operates on an input file 112 corresponding to the entropy-decoded video data received from step 104 (FIG. 3). It assumes that the number of block sizes that were used in compressing the input, unencrypted video file is not known in advance, and therefore tests the video data to determine the extent to which it uses VBSMC. (If the VBSMC encoding parameters are known in advance, then this sort of testing is unnecessary.) The reason this testing is desirable is that some encoders do not use the full gamut of block sizes permitted by H.264, typically because of the computational load involved in motion encoding using all of the different block sizes. Encrypting the block size values alone may not provide sufficient security against hacking when only a limited gamut is used.

To test the video data, the encryptor checks input file 112 to determine whether it uses VBSMC at all, at a VBSMC testing step 114. Typically, the encryptor runs over and samples many frames in order to gather reliable VBSMC statistics. If VBSMC is used, the encryptor checks the number of different block sizes used in the input file, at a block size number checking step 116. If the encoder used less than a threshold number of block sizes (or did not use VBSMC at all), the encryptor concludes that block size encryption alone will not be adequate to protect the present input file. In such cases, other components of the file may be encrypted, in addition to or instead of the block sizes. The inventors have found that in order to rely on block size encryption alone, the encoded video data should include at least four different block sizes.

Even when the number of different block sizes is sufficient, it is still important that the range of different block sizes be used throughout the video file, and not just be concentrated in one or a few parts of the file. Otherwise, a hacker may be able to decrypt the parts of the file that use relatively few block sizes. Therefore, the encryptor checks the distribution of block sizes over input file 112, at a block size distribution checking step 118. A procedure that may be used for this purpose is described below in an Appendix below. If the block size variation extends sufficiently throughout the file, the encryptor will use block size encryption, at an encryption step 120. Otherwise, other components of the file may also be encrypted.

Figure 5:
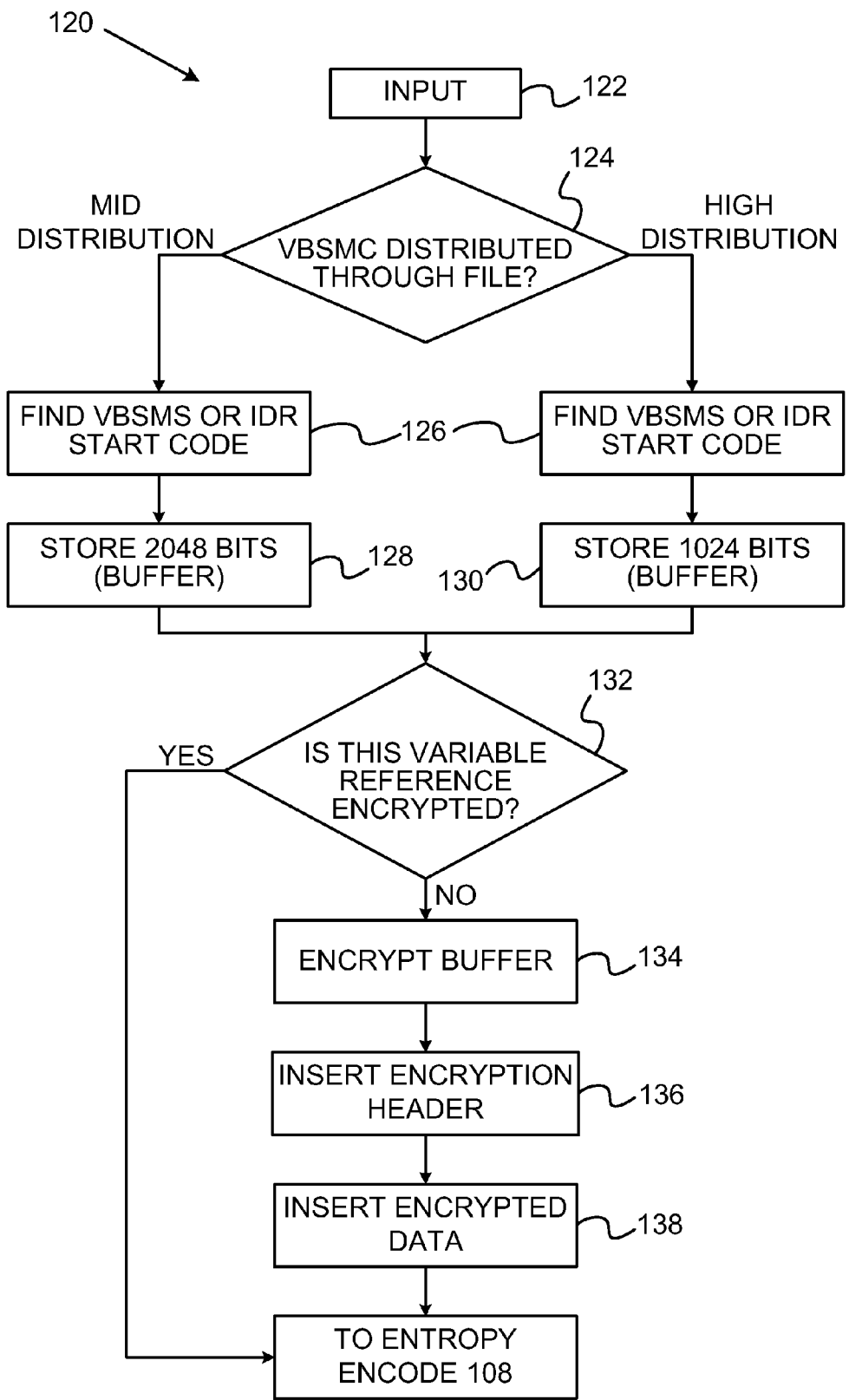
FIG. 5 is a flow chart that schematically illustrates a method for partial encryption of a video data stream, in accordance with an embodiment of the present invention.

FIG. 5 is a flow chart that schematically shows details of encryption step 120, in accordance with an embodiment of the present invention. The method operates on an input file 122 (which may be identical to input file 112 in FIG. 4). The encryptor checks the distribution of blocks sizes through the input file, at a distribution checking step 124. This step is similar to that performed at step 118, and the two steps may, in fact, be combined using the procedure described in the Appendix below. The purpose of step 124 is to discriminate between two alternative levels of block size encryption that can be used, depending upon whether the different block sizes are highly distributed through the input file or are only moderately well distributed (middling distribution).

In either case, after deciding on the level of encryption at step 124, the encryptor encrypts parts of the file in multiple, successive iterations. At each iteration, the encryptor advances to the next VBSMC block size listing in the input file or to the next start code of an IDR frame, at an encryption target finding step 126. In some embodiments, the entire IDR frame is encrypted to prevent unauthorized clients and hackers from using any part of the file. Alternatively, in the embodiment shown in FIG. 5, only the start and possibly some additional elements of the IDR frame are encrypted.

After finding a block size listing at step 126, the encryptor stores a certain amount of data in its buffer, including the block size value itself and the data that immediately follow it. For a file with highly-distributed block size values, the encryptor stores 1024 bits of data, at a buffering step 130 whereas for a middling distribution of block size values, the encryptor stores 2048 bits of data, at a buffering step 128. Thus, in either case in this embodiment, the encryptor will typically encrypt a certain amount of additional data along with the block size values, but without encrypting all of the parameters representing the inter frames.

The encryptor checks the buffered data to determine whether the current block size reference in the data is already encrypted, at an encryption checking step 132. In other words, if the current frame uses a block size reference from a previous frame, rather than introducing a new block size value, then there is no need to encrypt this reference. In such cases, the encryptor just passes the buffered data directly to entropy encoding at step 108 (FIG. 3) without further encryption. This sort of selective encoding will reduce the computational load required for decryption by the client.

When the data in the current buffer are not yet encrypted, the encryptor encrypts the data, at a buffer encryption step 134. It then inserts an encryption header into the data stream, ahead of the encrypted data, at a header insertion step 136. Since the output data stream will be only partially encrypted, the header is needed in order to signal to the client decoder that decryption should start at this point. The header typically includes a key identifier and encryption length parameter, and may also indicate the method of encryption that has been used. The encryptor inserts the encrypted data into the data stream immediately after the header, in place of the previously unencrypted block size value and other buffered data, at an encrypted data insertion step 138. It then passes this data stream to the entropy encoder at step 108. This method continues until the block sizes in the entire file have been encrypted.

Although the "integrated" and "post-encoding" implementations are presented above as separate and distinct embodiments of the present invention, various features of each of these implementations may similarly be used in the other. In this manner, additional embodiments may be defined, all of which are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

VBSMC Distribution Checking

In order to evaluate the distribution of block size variations throughout an input file (as in steps 118 and 124 described above), the encryptor scans the file to identify locations of block size parameters and the respective parameter values. It records the parameter values and their respective location offsets relative to the beginning of the file. It then computes the following parameters:

FS==file size

NoV==number of block size parameters listed

MT==Max{offset(n+1)−offset(n)} (maximum distance between two successive block size parameter listings)

MI==Maximum distance between two successive listings containing identical block size values AvD==FS/NoV (average distance between block size parameter listings)

If AvD is less than $x_1$*MT and also less than $y_1$*MI, wherein $x_1$ and $y_1$ are empirically-derived parameters, then the variable block sizes can be considered to be highly distributed throughout the input file. In this case, block size encryption can be used with confidence to encrypt to entire file. Otherwise, as long as AvD is less than $x_2$*MT and less than $y_2$*MI, for certain values $x_2<x_1$ and $y_2<y_1$, block size encryption can still be used, but with a larger buffer for greater data security, as shown above in FIG. 5. This latter situation can be considered to be a middling distribution of variable block sizes. If this looser criterion is also not met, then it may be necessary to encrypt additional components of the file in order to achieve good data security.

The invention claimed is:

1. A method for data processing, comprising:
providing a sequence of image frames that is encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients;
selectively encrypting the block sizes, using an encryptor, without encrypting all of the parameters representing the inter frames; and
outputting encoded data representing the sequence of the image frames and comprising the encrypted block sizes,
wherein, without the encoded data comprising the correct values of block sizes, it will be near impossible to decode the image frames.

2. The method according to claim 1, wherein providing the sequence comprises providing a video sequence that is compressed using a H.264 video encoder.

3. The method according to claim 1, wherein outputting the encoded data comprises transmitting the encoded data over a network to a client device, and wherein the method comprises decrypting the encrypted block sizes at the client device, and using the decrypted block sizes in decoding the data so as to reconstruct the sequence of the image frames.

4. The method according to claim 1, and comprising selectively encrypting at least a part of the intra frames, in addition to encrypting the block sizes.

5. The method according to claim 1, wherein selectively encrypting the block sizes comprises encrypting the block sizes in the video encoder as a part of a process of encoding the sequence of the image frames.

6. The method according to claim 1, wherein providing the sequence of the image frames comprises receiving an input file of compressed video data, and wherein selectively encrypting the block sizes comprises processing the input file so as to identify the block sizes, and replacing the block sizes with the encrypted block sizes.

7. The method according to claim 1, wherein the block sizes are selectively encrypted without encrypting the transform coefficients.

8. The method according to claim 1, wherein selectively encrypting the block sizes comprises evaluating a distribution of different values of the block sizes over the sequence, and choosing a mode of encryption to apply to the images responsively to the distribution.

9. The method according to claim 8, wherein choosing the mode of the encryption comprises encrypting a smaller part of the inter frames when the values of the block sizes are widely distributed over the image frames in the sequence than when the block sizes are not widely distributed.

10. Apparatus for data processing, comprising:
an encoder, which is configured to output encoded data representing a sequence of image frames, wherein the image frames are encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients; and
an encryptor, which is configured to selectively encrypt the block sizes without encrypting all of the parameters representing the inter frames, and to provide the encrypted block sizes for insertion in the encoded data output by the encoder,
wherein, without the encoded data comprising the correct values of block sizes, it will be near impossible to decode the image frames.

11. The apparatus according to claim 10, wherein the sequence comprises a video sequence that is compressed using a H.264 video encoder.

12. The apparatus according to claim 10, and comprising a transmitter, which is coupled to transmit the encoded data including the encrypted block sizes over a network to a client device.

13. The apparatus according to claim 12, and comprising a client device, which is coupled to receive the encoded data, to decrypt the encrypted block sizes, and to decode the data using the decrypted block sizes in decoding the data so as to reconstruct the sequence of the image frames.

14. The apparatus according to claim 10, wherein the encryptor is configured to selectively encrypt at least a part of the intra frames, in addition to encrypting the block sizes.

15. The apparatus according to claim 10, wherein the encryptor is integrated into the encoder so as to selectively encrypt the block sizes as a part of a process of encoding the sequence of the image frames.

16. The apparatus according to claim 10, wherein the encryptor is configured to receive an input file of compressed video data, and to process the input file so as to identify the block sizes, and replace the block sizes with the encrypted block sizes.

17. The apparatus according to claim 10, wherein the block sizes are selectively encrypted without encrypting the transform coefficients.

18. The apparatus according to claim 10, wherein the encryptor is configured to evaluate a distribution of different values of the block sizes over the sequence, and to choose a mode of encryption to apply to the images responsively to the distribution.

19. The apparatus according to claim 18, wherein the encryptor is configured to encrypt a smaller part of the inter frames when the values of the block sizes are widely distributed over the image frames in the sequence than when the block sizes are not widely distributed.

20. A computer software product, comprising a non-transitory computer-readable medium in which program instructions are stored, which instructions, when read by a computer, cause the computer to partially encrypt a sequence of image frames that is encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients, by selectively encrypting the block sizes without encrypting all of the parameters representing the inter frames, and to output encoded data representing the sequence of the image frames and comprising the encrypted block sizes, wherein, without the encoded data comprising the correct values of block sizes, it will be near impossible to decode the image frames.

21. A method for data processing, comprising:

receiving a partially-encrypted sequence of image frames that has been encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients, and by selectively encrypting the block sizes without encrypting all of the parameters representing the inter frames;

decrypting the block sizes using a decryptor; and decoding the encoded image frames in a decoder using the decrypted block sizes, wherein, without the encoded data comprising the decrypted values of block sizes, it will be near impossible to decode the image frames.

22. A client device, comprising:

a receiver, which is configured to receive a partially-encrypted sequence of image frames that has been encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients, and by selectively encrypting the block sizes without encrypting all of the parameters representing the inter frames;

a decryptor, which is coupled to decrypt the block sizes; and a decoder, which is configured to decode the encoded image frames using the decrypted block sizes, wherein, without the decrypted block sizes, it will be near impossible to decode the image frames.

23. A computer software product, comprising a non-transitory computer-readable medium in which program instructions are stored, which instructions, when read by a computer, cause the computer to receive a partially-encrypted sequence of image frames that has been encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients, and by selectively encrypting the block sizes without encrypting all of the parameters representing the inter frames, to decrypt the block sizes, and to decode the encoded image frames using the decrypted block sizes, wherein, without the decrypted block sizes, it will be near impossible to decode the image frames.

24. Apparatus for data processing, comprising:

means for providing a sequence of image frames that is encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients;

means for selectively encrypting the block sizes without encrypting all of the parameters representing the inter frames; and means for outputting encoded data representing the sequence of the image frames and comprising the encrypted block sizes, wherein, without the decrypted block sizes, it will be near impossible to decode the image frames.

25. Apparatus for data processing, comprising:

means for receiving a partially-encrypted sequence of image frames that has been encoded by identifying intra and inter frames in the sequence and applying a variable block size motion compensation (VBSMC) procedure to the inter frames, thereby generating respective parameters representing the inter frames, the parameters including block sizes, motion vectors, and transform coefficients, and by selectively encrypting the block sizes without encrypting all of the parameters representing the inter frames;

means for decrypting the block sizes; and means for decoding the encoded image frames using the decrypted block sizes, wherein, without the decrypted block sizes, it will be near impossible to decode the image frames.

* * * * *

UNITED STATES PATENT AND TRADEMARK OFFICE
CERTIFICATE OF CORRECTION

PATENT NO. : 8,731,193 B2  
APPLICATION NO. : 13/379552  
DATED : May 20, 2014  
INVENTOR(S) : Farkash et al.

Page 1 of 1

It is certified that error appears in the above-identified patent and that said Letters Patent is hereby corrected as shown below:

In the list of "Other Publication" on the title sheet, add --23 December 2013 Office Communication in connection with prosecution of CA 2,766,308--.

In the Specification

In column 7, line 12, delete "module compresses" and substitute therefor --module 64 compresses--.

Signed and Sealed this  
Twenty-first Day of October, 2014

Michelle K. Lee  
*Deputy Director of the United States Patent and Trademark Office*